United States Patent [19]
Wake

[11] Patent Number: 5,654,964
[45] Date of Patent: Aug. 5, 1997

[54] ATM TRANSMISSION SYSTEM

[75] Inventor: Yasuhiro Wake, Tokyo, Japan

[73] Assignee: NEC Corporation, Japan

[21] Appl. No.: 560,191

[22] Filed: Nov. 21, 1995

[30] Foreign Application Priority Data

Nov. 24, 1994 [JP] Japan ................. 6-289335

[51] Int. Cl.$^6$ ................................. H04L 12/56
[52] U.S. Cl. ............................... 370/395; 370/474
[58] Field of Search ................... 370/84, 94.1, 94.2, 370/94.3, 60, 60.1, 61, 106, 58.1, 100.1, 493, 494, 495, 496, 465, 467, 471, 474, 475, 468, 476, 479, 391–393, 395, 398, 399, 401, 902, 905, 908, 532–537, 412, 522, 236; 375/225, 227, 254, 296, 240; 379/93–97, 60; 348/13, 14, 518, 468, 512; 341/50, 51, 52, 56, 60, 61

[56] References Cited
U.S. PATENT DOCUMENTS 5,408,469 4/1995 Opher et al. .................. 370/60.1

FOREIGN PATENT DOCUMENTS 522153 11/1994 Japan.

Primary Examiner—Dang Ton
Attorney, Agent, or Firm—Ostrolenk, Faber, Gerb & Soffen, LLP

[57] ABSTRACT

An LD-CELP coder 211 codes an input signal supplied through a telephone line based on the low-delay code-excited linear prediction. A speech detector 212 detects voice/no-voice of the input signal. A FAX terminal input detector 213 detects a FAX signal. A multiplexer 214 multiplexes the coded data and the voice/no-voice data through bit steal of one bit per frame from the code. In a CLAD (cell assembling and disassembling) unit 300, a speech data frame is detected, and also the voice/no-voice information that has been multiplexed in the coded data is detected. If the voice/no-voice information indicates voice, the coded data is converted to cell data to be sent out to a transmission line. Concurrently with the operation of the coder, FAX terminal input data is all converted to cell data and sent out to the transmission line independently of the voice/no-voice information.

10 Claims, 8 Drawing Sheets

ATM TRANSMISSION SYSTEM

BACKGROUND OF THE INVENTION

The present invention relates to ATM transmission systems for assembling and transmitting information into data cells having a predetermined bit number and, more particularly, to an ATM transmission system which assembles only the speech portion of a speech signal into cells for transmission.

To date, speech coding methods in speech coders have used a CELP (Code-Exited Linear Prediction) system which is one of speech analysis and synthesis methods, or an LD-CELP (Low-Delay Code-Exited Linear Prediction) system which is an improvement of the CELP system. The LD-CELP system is a typical vector quantization system in which successive excitation vector candidates from excitation vector codebooks are passed through a synthesis filter to transmit an index of a codebook with which decoded speech closest to the input signal is obtained. The index is a parameter to be transmitted. A problem encountered in such systems is that burying a voice/no-voice bit through bit steal of the index independently of the data coding process, results in different code vectors between the coding and decoding sides. That is, difficulty is encountered when burying the voice/no-voice bit in the coded data.

A prior art ATM speech transmission system utilizes such high efficient speech codec. A CLAD (Cell Assembling and Disassembling) apparatus for assembling and disassembling the transmission cells includes a speech detector for detecting voice/no-voice and the speech decoder with a high efficient coding of the speech signal. Only when the speech detector detects the voice, the coded data are assembled into cells and thus obtained cell data are transmitted without the addition of any code bit or the like directly by a mode switcher.

In a prior art ATM speech codec adopting the CELP system (as disclosed in Japanese Patent Laid-Open Publication Heisei 5-22153), the voice and no-voice are detected, and when the no-voice is detected the power supply is held "off" during the frame period, which is irrelevant to the coding, in order to save power. In this system, no voice/no-voice bit is multiplexed in the cell. In addition, it has been difficult in such a system to transmit the CELP coded data by multiplexing the voice/no-voice data, and therefore only the voice part of the signal is converted to cells without decoding the coded data. This gives rise to a problem if it is intended to introduce the ATM transmission line locally into an existing CBR (Constant Bit Rate) network constituted by CBR transmission lines. To this end, it is necessary that the coded data be decoded once and then coded again at the inter-connection point between CBR transmitter adopting the CELP coding system and the ATM transmitter. The speech quality, therefore, is deteriorated by repeated coding and decoding of the data. A further disadvantage is that for the repeated coding and decoding of data it is necessary to store once cells have a predetermined bit number, and this increases the propagation delay. A still further disadvantage is that in order to minimize the speech quality deterioration it is necessary to replace all the existing network CBR transmitters with ATM transmitters, which spoils the economy of the network.

SUMMARY OF THE INVENTION

An object of the invention is therefore to provide an ATM speech coding system, capable of minimizing the speech quality deterioration and the signal propagation delay generated due to the data storage for assembling and disassembling the cells and to high efficient speech codec and decoding, without requiring the change of the transmission rate of the existing CBR network and the necessity of repeated coding and decoding of data in case of its interconnection to an ATM transmission line.

According to one aspect of the present invention, there is provided an asynchronous transmission mode speech coding system comprising: a high efficient speech codec unit provided between an asynchronous transmission mode transmission line along which digital data is transmitted and received in an asynchronous transmission mode, and a switchboard for switching telephone frequency band speech signals and for high efficient coding and decoding the telephone frequency band speech signals and FAX signals; and a cell assembling and disassembling unit including means for dividing coded data from the high efficient speech codec unit into frames of a first fixed bit number, adding a header of a second fixed bit number to each of the frames, producing a cell having a third fixed number and sending out the cells thus produced to the asynchronous transmission mode transmission line, and means for separating data having been coded in the high efficient speech codec unit from cells transmitted from the asynchronous transmission mode transmission line and transmitting the separated data to the high efficient speech codec unit; the high efficient speech codec unit including: speech coding means for coding a telephone frequency band speech signal received from the switchboard into digital data of a low bit rate and outputting the coded data as a digital speech signal of a first format; speech detecting means for outputting voice/no-voice information of input speech by checking input signal power from the telephone frequency band speech signal received from the switchboard; and a facsimile signal coding means for checking, from the telephone frequency band speech signal received from the switchboard, whether the input signal is a modulated signal from a facsimile input terminal and, if the input signal is a modulated signal from the facsimile input terminal, sending out a facsimile signal detection signal indicative of the reception of the modulated signal while sending out a digital speech signal of a second format for a predetermined period of time and then sending out a digital signal of a third format obtained through demodulation of the modulated signal; the cell assembling and disassembling unit further including: facsimile transmission start data detecting means for detecting the second format digital speech signal for a predetermined period of time; and cell producing means for producing cells of the third fixed bit number by adding a header of the second fixed bit number to each frame of a digital speech signal of a fourth format or of the digital speech signals of the second and third formats and sending out the cells thus produced to the asynchronous transmission mode transmission line; the cell assembling and disassembling unit still further including: means for deleting the header of the second fixed bit number from each cell received from the asynchronous transmission mode transmission line and transmitting the resultant data as a digital signal of a seventh format to the high efficient speech codec unit; and means for transmitting a digital signal of a sixth format to the high efficient speech codec unit in the absence of cell received from the asynchronous transmission mode transmission line; the high efficient speech codec unit further including: means for checking whether digital signal of the sixth format is received from the cell assembling and disassembling unit and, if the signal is received, outputting noise to the switchboard; and facsimile signal decoding means for detecting, when no digital signal of the sixth format is received from the cell assembling and disassembling unit, the digital voice signal of the second format from the digital signal of the seventh format for a predetermined period of time and when it is detected modulating the subsequent digital signal of the third format and transmitting the modulated signal to the switchboard; the high efficient speech codec unit still further including: means for receiving the digital speech signal of the first format and result data of the check in the voice detecting means and producing the digital speech signal of the fourth format by multiplexing the two received signals through bit steal of one bit for each frame; and means for receiving the digital speech signal of the fourth format and the facsimile signal detection signal as well as the second format digital speech signal and third format digital signal from the facsimile signal coding means, selecting the fourth format digital speech signal if the facsimile signal detection signal indicates detection of no facsimile signal while selecting the second format digital voice signal and third format digital signal from the facsimile signal coding means if the facsimile signal detection signal indicates detection of a facsimile signal, and transmitting the selected signal as a digital signal of a fifth format to the cell assembling and disassembling unit; the cell assembling and disassembling unit yet further including: voice/no-voice bit detecting means for extracting the result data, having been bit steal multiplexed, of the voice detecting means from the digital signal of the fifth format; and cell producing means controlled according to the voice/no-voice bit so as to assemble cell data of the afore-the frame configuration from the second and fourth format digital speech signals if the bit indicates voice while assembling no cell data if the bit indicates no-voice, and also controlled according to the result of detection of the facsimile transmission start data such that if the digital speech signal of the second format has been detected for a predetermined period of time, subsequently received data is not subjected to the cell production control according to the voice/no-voice bit but is all converted to cell data to be sent out to the asynchronous transmission mode transmission line; the high efficient speech codec unit yet further including: speech decoding means for decoding the digital speech signal of the seventh format and transmitting the decoded signal to the switchboard if no digital signal of the sixth formula is detected as digital signal received from the cell assembling and disassembling unit or if no digital speech signal of the seventh format is detected from the digital signal of the seventh format.

According to another aspect of the present invention, there is provided a asynchronous speech coding system for inputting and outputting a telephone frequency band signal with respect to a switchboard through a high efficient speech codec unit and for inputting and outputting cells with respect to an ATM transmission line through a CLAD unit, the high efficient speech codec unit comprising on a transmission side, an LD-CELP speech coder for coding the speech signal, a speech detector for detecting voice and no-voice by monitoring the input speech power, a FAX signal coder for detecting a modulation signal inputted from a FAX terminal, a multiplexer for receiving a first signal from the voice detector and a second signal from the LD-CELP speech coder, and a selector for receiving a third signal of the multiplexer, a fourth signal indicative of FAX start data which is transmitted for a predetermined period of time upon detection of the FAX signal, and a fifth signal which is demodulated data of a modulated signal from actual FAX terminal of the FAX signal coder and output a sixth signal indicative of whether the FAX signal has been detected and selecting, based on the sixth signal, one of the fourth, sixth signals and the third signal of the multiplexer as a seventh signal of the transmitting side of the high efficient speech codec unit, the CLAD unit comprising, on the transmission side a voice/no-voice bit detector for receiving the seventh signal from the transmitting side of the high efficient speech codec unit and extracting the voice/no-voice bit from the seventh signal, a FAX start data detector for detecting the fourth signal from the seventh signal, and a cell assembler which, in case of failure of detection of the fourth signal from the seventh signal, assembles cells and sends out the assembled with a header data to the ATM transmission line according to the result of detection in the voice/no-voice discrimination bit detector, and on the receiving side a voice cell data receiver which, when receiving the cell data from the ATM transmission line, deletes the header data that has been added on the transmitting side and outputs the resultant data in the frame format of an eighth signal, and a no-voice cell data receiver which, in the absence of cell received, outputs a ninth signal having a frame configuration, the high efficient speech codec unit further including on the receiving side, an LD-CELP speech decoder for decoding the eighth signal received from the CLAD unit to reproduce a speech signal, a no-voice compensation noise generator for outputting a first control signal for controlling the switching of the output signal to the switchboard and, no-voice compensation white noise at a level close to the environmental noise of the speech, the input signal from the CLAD unit is of the ninth signal format and, a FAX signal decoder for outputting a second control signal for controlling the switching of the output signal to the switchboard and modulating the subsequent fifth signal to output the modulated signal as the FAX signal if the fourth signal is received, and a selector for selectively outputting, according to the first and second control signals, either one of the outputs of the LD-CELP speech decoder, no-voice compensation noise generator and FAX signal decoder to the switchboard.

According to other aspect of the present invention, there is provided an asynchronous speech coding system comprising: a first coder for coding n input signal supplied through a telephone line based on the low-delay code-excited linear prediction; a first detector for detecting voice/no-voice data of the input signal; a FAX terminal input detector for detecting a FAX signal of the input signal; a multiplexer for multiplexing the coded data and the voice/no-voice data; a second detector for detecting a speech data frame and the voice/no-voice data from the multiplexed data; a conversion means for converting the coded data to cell data to be sent out to a transmission line if the voice/no-voice information indicates voice and FAX terminal input data to cell data and transmitting the converted cell data to the transmission line independently of the voice/no-voice data.

Other objects and features of the present invention will be clarified from the following description with reference to attached drawings.

DETAILED DESCRIPTION OF THE PREFERRED EMBODIMENTS

Figure 1:
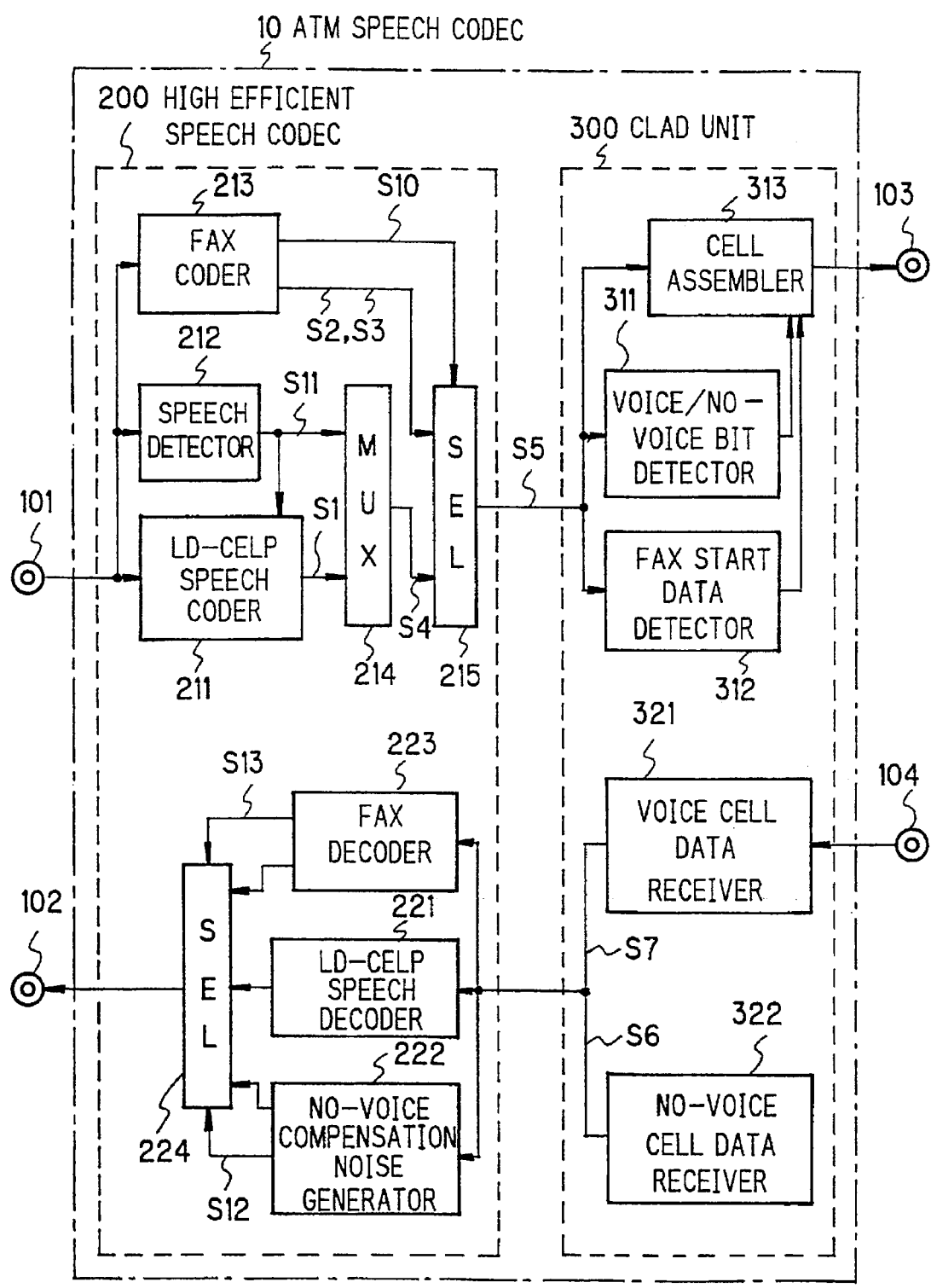
FIG. 1 is a block diagram showing an embodiment of the ATM speech coding system according to the present invention.

FIG. 1 is a block diagram showing an embodiment of the ATM speech coding system according to the present invention.

Referring to FIG. 1, there is shown the ATM speech codec system 10, which comprises terminals 101 and 102 for inputting and outputting a telephone frequency band signal with respect to a switchboard, terminals 103 and 104 for inputting and outputting cells with respect to an ATM transmission line, a high efficient speech codec unit 200 connected between the terminals 101 and 102, and a CLAD unit 300 for assembling and disassembling the cells is connected between the terminals 103 and 104. The high efficient speech codec unit 200 and CLAD unit 300 are connected to each other.

The high efficient speech codec unit 200 includes an LD-CELP speech coder 211 for coding the speech signal for the transmitting side; a speech detector 212 for detecting voice and no-voice by monitoring the input speech power; a FAX signal coder 213 for detecting a modulation signal inputted from a FAX terminal; a multiplexer 214 for receiving an output result signal S11 from the voice detector 212 and an output signal S1 from the LD-CELP speech coder 211, and a selector 215 for receiving output signal S4 of the multiplexer 214, FAX signal coded output signals S2 and S3 of the FAX signal coder 213 and output signal S10 indicative of whether a FAX signal has been detected, and the selector 215 for selecting, based on the signal S10, one of the FAX signal coded output signals S2, S3 and the output signal S4 of the multiplexer 214 as an output signal S5 of the transmitting side of the high efficient speech codec unit 200. The output signal S11 of the voice detector 212 is supplied to the LD-CELP speech coding section 211 for controlling the codebooks. The FAX signal coder output signal S2 is FAX start data which is transmitted for a predetermined period of time upon detection of the FAX signal, and the signal S3 is demodulated data of a modulated signal from an actual FAX terminal. The signals S1 and S2 have a 320-bit frame configuration. The signal S4 has a frame configuration obtained bit steal multiplexing the signal S11, indicative of a voice/no-voice bit signal, on the frame forefront. The signal S2 has a structure so that the frame forefront bit is fixed to a code indicative of voice.

The CLAD unit 300 includes a voice/no-voice bit detector 311 for receiving the output signal S5 from the transmitting side of the high efficient speech codec unit 200 and for extracting the voice/no-voice bit from the output signal S5; a FAX start data detector 312 for detecting the FAX start data S2 from the signal S5, and a cell assembler 313 which; in case of failure of detection of the FAX start data S2 from the signal S5, assembles cells and sends out these cells through the output terminal 105 to the ATM transmission line according to the result of detection in the voice/no-voice discrimination bit detector 311, i.e., when and only when the voice is detected. When the FAX start data S2 is detected from the signal S5, the cell assembler 313 converts all the subsequent data of signal S3 into cells to be outputted through the output terminal 103 to the ATM transmission line regardless of the detection results in the voice/no-voice bit detector 311. The cell assembler 313 adds a 40-bit header to every 320 bits of data as one frame and outputs the result data as one cell through the output terminal 103 to the ATM transmission line. The receiving side of the CLAD unit 300 includes a voice cell data receiver 321 which, when receiving the cell data from the ATM transmission line, deletes the 40-bit header data that has been added on the transmitting side and sends out the resultant data in the frame format of signal S7 to the LD-CELP speech decoder 221. The receiving side of the CLAD unit 300 also includes a no-voice cell data receiver 322 which, in the absence of cell received from the input terminal 104, transmits to the LD-CELP speech decoder 221 a signal S6 having a frame configuration.

The high efficient speech codec unit 200 includes an LD-CELP speech decoder 221 for decoding a signal S7 received from the CLAD unit 300 to reproduce a speech signal, a no-voice compensation noise generator 222 for always checking whether its input signal from the CLAD unit 300 is of the signal S6 format and, if so, i.e., in case of the signal S6 format, outputting a control signal S12 for controlling the switching of the output signal to the switchboard and, no-voice compensation white noise at a level close to the environmental noise of the speech, a FAX signal decoder 223 for always checking a input signal S7 from the CLAD unit 300 and, if the FAX start signal S2 is received, outputting a control signal S13 for controlling the switching of the output signal to the switchboard and modulating the subsequent signal S3 to output the modulated signal as the FAX signal, and a selector 224 for selectively outputting, according to the signals S12 and S13, either one of the outputs of the LD-CELP speech decoder 221, no-voice compensation noise generator 222 and FAX signal decoder 223 through the output terminal 102 to the switchboard.

Figure 2:
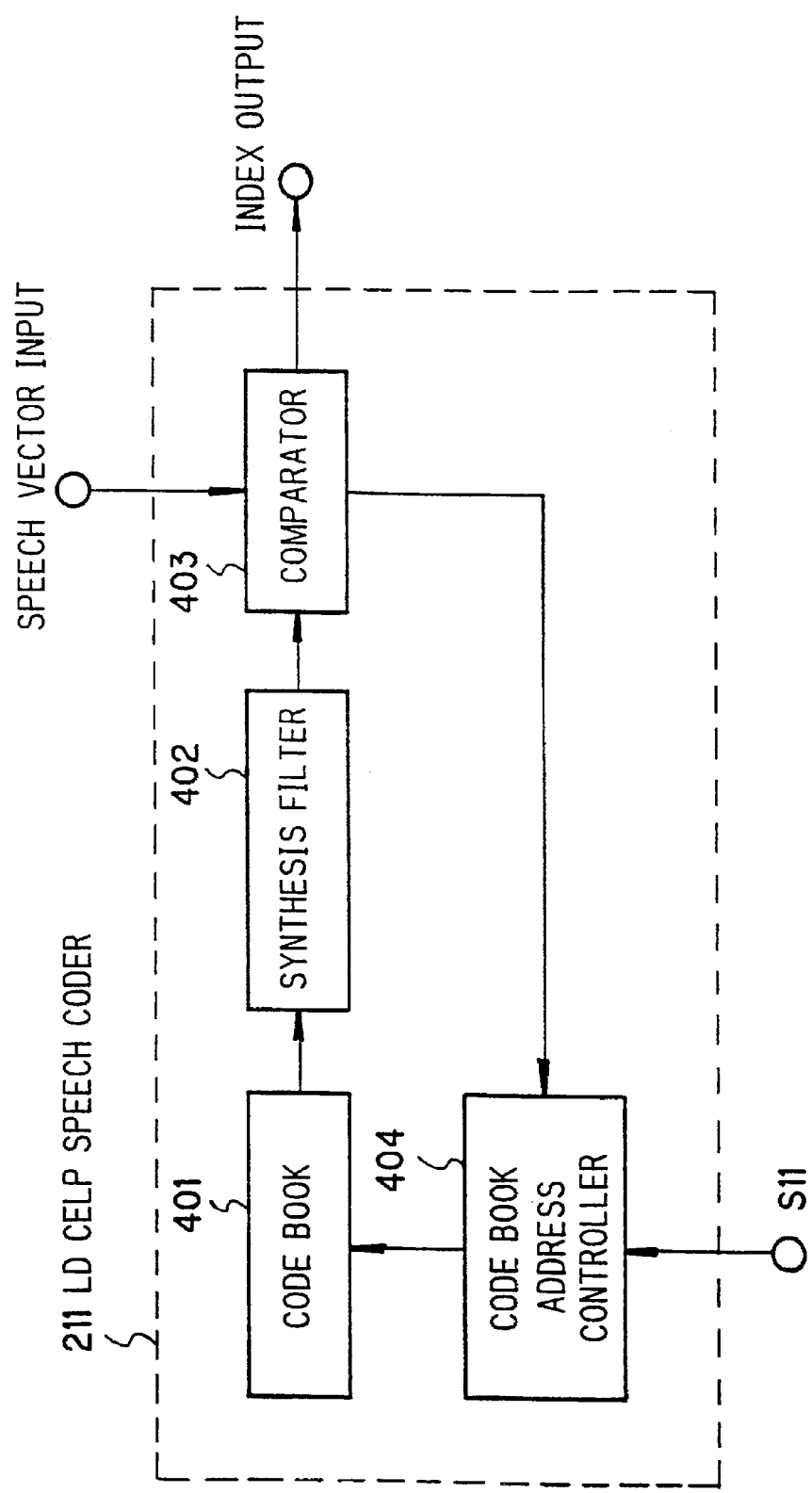
FIG. 2 is a block diagram showing an example of a LD-CELP speech coder for coding the speech signal with five successive input samples as one vector.

FIG. 2 is a block diagram showing an example of the LD-CELP speech coder 211 for coding the speech signal with five successive input samples as one vector. The LD-CELP speech coder 211 includes a codebook 401 which is constituted by 1,024 exciting source vector candidates, and a synthesis filter 402 for successively receiving the exciting source vector candidates having coefficients for synthesized signal calculation obtained by the linear prediction analysis result. The LD-CELP speech coder 211 also includes a comparator 403 for comparing successive input vectors with the synthesis filter output and outputting an index of the exciting vector which results in speech closest to the input, and a codebook address controller 404 for reducing the number of exciting source vector candidates to one half, i.e., 512, with the timing of the bit steal according to the output signal S11 from the voice detector 212.

In operation, a telephone frequency band signal from the switchboard, when supplied to the input terminal 101, is inputted simultaneously to the LD-CELP speech coder 211, voice detector 212 and FAX signal coder 213. The LD-CELP speech coder 211 divides the input signal into five successive input sample vectors and executes a coding process. The coding process is executed irrespective of whether the result from the voice detector 212 shows voice or no-voice. In the codebook 401 used in the coding process, the number of exciting vector candidates is limited to one half, i.e., 512, with the timing of the bit steal multiplexing of the output signal S11 of the voice detector 213 on the coded data. This control is executed at the time of the retrieval for the first index in one frame, and upon provision of the output signal S11 of the voice detector 212 the codebook address controller 404 outputs only the codebook addresses of 512 exciting source vector candidates. The exciting source vector candidates of the designated addresses are successively inputted to the synthesis filter 402 for the synthesized signal. calculation. The synthesis filter 402 has coefficients obtained by the result of linear prediction analysis. The input vectors are successively inputted along with the synthesis filter output to the comparator 403, which outputs the 9-bit index of an exciting vector which leads to reproduced speech closest to the input.

For an index other than the first one in one frame, whenever samples for one frame are inputted, exciting source vector candidates are inputted successively from the codebook 401 which comprises 1,024 exciting source vector candidates to the synthesis filter 402 in the LD-CELP speech coder 211 for synthesizing signal calculation. The input speech vectors are inputted successively along with the synthesis filter output to the comparator 403. The comparator 403 outputs, for each vector, the 10-bit index of an exciting vector which leads to reproduced speech closest to the input.

Figure 3:
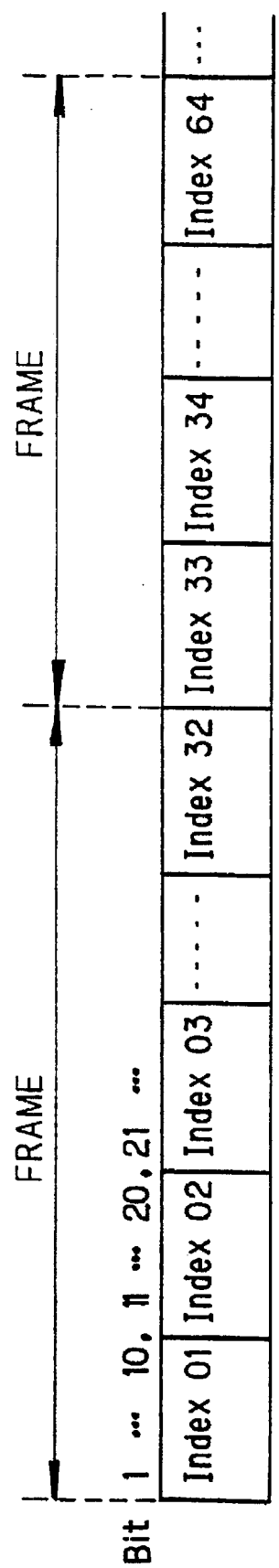
FIGS. 3 to 8 show the signals S1, S4, S2, S3, S6 and S7 in FIG. 1.

The signal S1 has a format as shown in FIG. 3. Referring to the FIG. 3, labeled Index 01, Index 02, are 10-bit output data from the LD-CELP speech coder 211.

The voice detector 212 is always checking the input signal power and outputs, in comparison to a threshold level, a signal S11 indicating voice when the input signal power is higher than the threshold level and indicating no-voice otherwise. Actually, the signal S11 is provided as a result of a data check for 20 milliseconds (a time length corresponding to 32 vectors in the LD-CELP speech coder) before the bit steal multiplexed bits. If a portion of the data is judged to correspond to voice during this time, the pertinent frame is regarded as a voice frame, and the multiplexer 213 multiplexes a bit indicative of voice.

Figure 4:
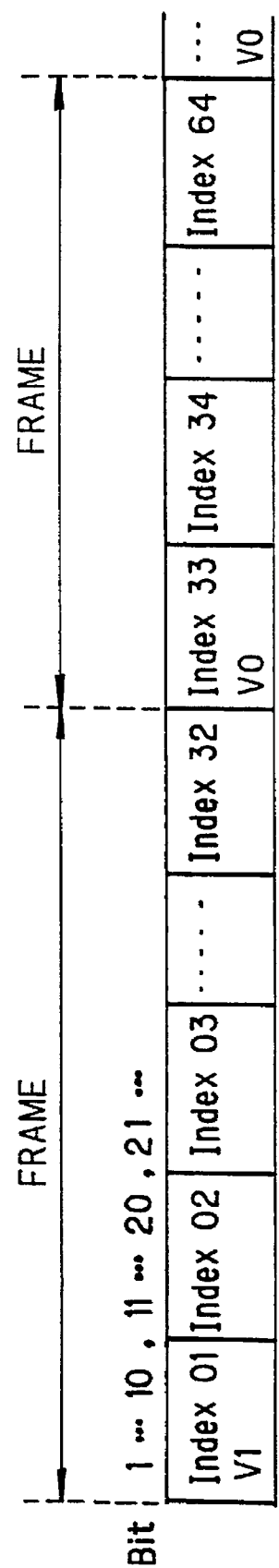

The signal S4 is shown in FIG. 4. Referring to FIG. 4, labeled V0 and V1 are forefront bits in the frame (MSBs of index) that indicate the check result of the preceding frame as outputted from the voice detector 212. V0 indicates that the preceding frame is a voice frame, and V1 indicates that the preceding frame is a no-voice frame.

The FAX signal coder 213 is always checking the input signal, and upon detection of a V.21 modulated signal from the FAX terminal, outputs a control signal S10 and also outputs the FAX start signal S2 and following demodulated signal S3 to be transmitted through a selector 215 to the CLAD unit 300. When the control signal S10 is provided, the selector 215 selectively transmits the signals S2 and S3 from the FAX signal coder 213 as serial data to the CLAD unit 300. Without provision of the control signal S10 it selectively transmits the signal S4 from the multiplexer 214 as serial data to the CLAD 300. The control signal S10, once outputted, is held until arrival of a call end signal from the switchboard. The signals S2 and S3 are shown in FIGS. 5 and 6, respectively.

Figure 5:
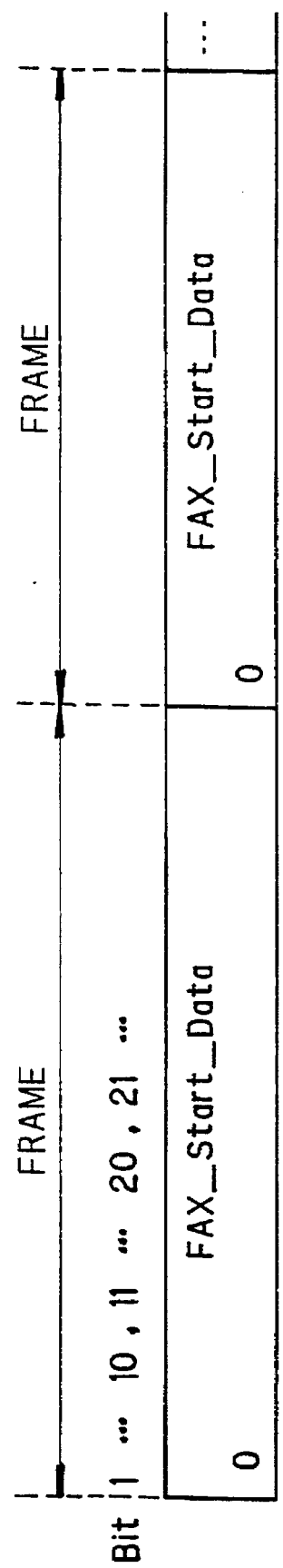

Referring to FIG. 5, the "Fax Start Data" is a bit pattern in which all 319 bits but the forefront bit of the frame are "0". This bit series usually can not occur with the index data outputted from the LD-CELP speech coder 211. The frame forefront bit is fixed as a voice bit indicative of the voice frame like the bit V0 in FIG. 4.

Figure 6:
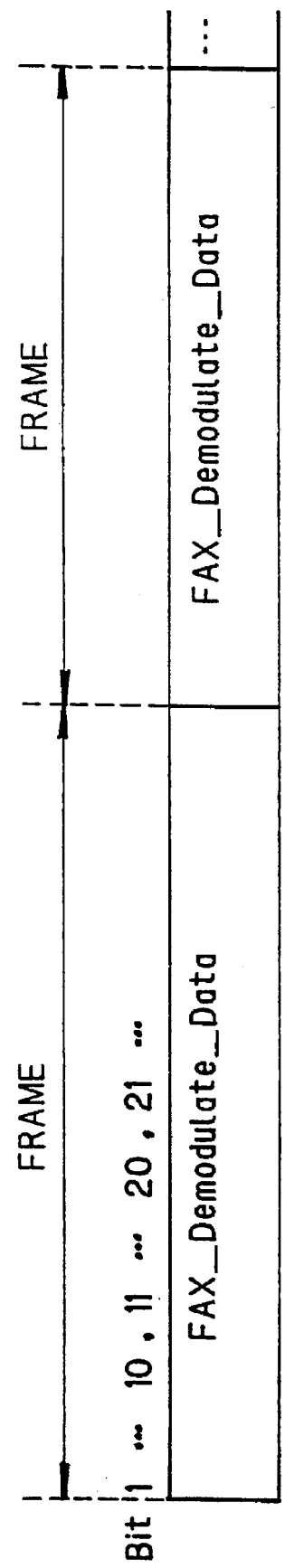

Referring to FIG. 6, the "FAX Modulate Data" is demodulated data from the FAX signal demodulator 223. The frame of this data is free from the voice/no-voice bit.

In the CLAD unit 300, the input signal S5 from the high efficient speech codec unit 200 is simultaneously inputted to the voice/no-voice bit detector 311, FAX start data detector 312 and cell assembler 313. While the FAX start data detector 312 does not detect the signal S2, the cell assembler 313 operates according to the result of a check in the voice/no-voice bit detector 311. The cell assembler 313 normally stores the signal S5 by MSB first storing in a 320-bit buffer, and determines whether it is necessary to form cells upon reception of a voice/no-voice bit. When the received voice/no-voice bit indicates no-voice, the 320-bit data that has been stored is discarded, and no cell is transmitted to the ATM transmission line. Upon appearance of a voice/no-voice bit indicative of voice, the forefront bit of the 320-bit data having been stored is made to be a voice bit, and then the 40-bit header is added. The resultant data is transmitted as a cell through the output terminal 103 to the ATM transmission line.

Upon detection of the signal S2 by the FAX start data detector 312, the cell assembler 313 produces cell data from all the received data by adding a 40-bit header for every 320 bits irrespective of the check result in the voice/no-voice detector 311. The cells thus produced are transmitted through the output terminal 103 to the ATM transmission line. The operation of the cell assembler 313 subsequent to the detection of the signal S2 is continued until arrival of a call end signal from the switchboard.

Cell data which is supplied from the ATM transmission line to the input terminal 104, is inputted to the voice cell data receiver 321. The voice cell data receiver 321 deletes the 40-bit header data having been added on the transmitting side and transmits sole necessary 320-bit data as serial data to the high efficient speech codec unit 200.

Without input of cell from the ATM transmission line, a no-voice bit is added as voice/no-voice bit to the forefront of the 320-bit data for transmission of the resultant data as serial data. At this time, the 319 bits among the 320 bits and excluding the voice/no-voice bit are ineffective data, and it is possible to make all the 319 bits "0", for instance. The processes of the 40-bit header addition and voice/no-voice bit change that are involved in the cell assembling and disassembling in the CLAD unit 300, substantially has no effect on the propagation delay because of the facts that the cell configuration in the ATM transmission format is of 424 bits inclusive of the header and that the data transmission on the ATM transmission line is at a very high rate, i.e., 155.52 Mbits/sec.

On the receiving side of the high efficient speech codec unit 200, the signals S6 and S7 from the CLAD unit 300 are inputted to the LD-CELP speech decoder 221 which decodes the signal S7 to reproduce the speech signal, to the no-voice compensation noise generator 222 which checks whether the input signal from the CLAD unit 300 is of the signal S6 format and, in case of the signal S6 format, outputs the control signal S12 for controlling the switching of the output signal to the switchboard and, at the same time, the input signal S7 from the CLAD unit 300, and to the FAX signal decoder 223 which always checks the input signal S7 from the CLAD unit 300 and, upon reception of the FAX start data outputs the control signal S13 for controlling the switching of the output signal to the switchboard while subsequently modulating the signal S3 to output the modulation as the FAX signal.

The selector 224 which transmits the Output through the output terminal 102 to the switchboard, operates under control of the signals S12 and S13, and outputs either one of the outputs of the LD-CELP speech decoder 221, no-voice compensation noise generator 222 and FAX signal decoder 223 to the switchboard. The signals S6 and S7 are shown in FIGS. 7 and 8, respectively.

Figure 7:
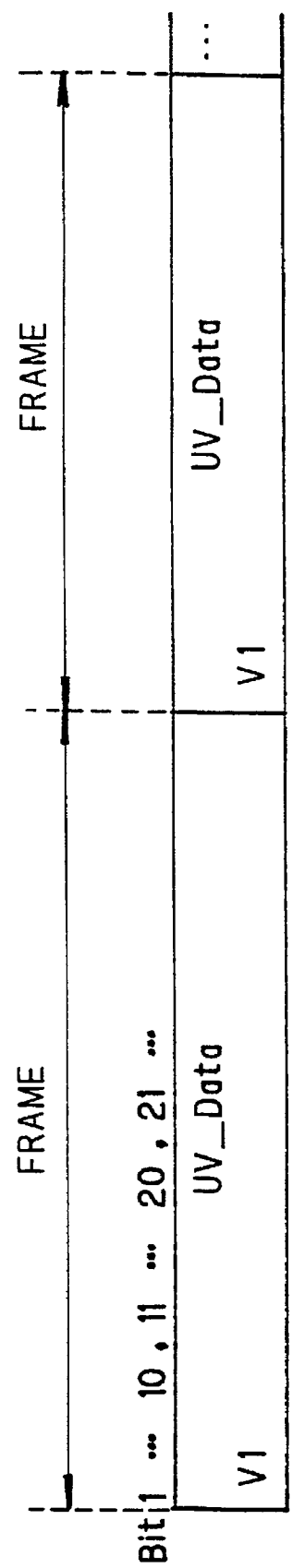

Referring to FIG. 7, labeled V1 is the forefront bit of the frame (i.e., MSB of index) and indicates that the prevailing frame is an no-voice frame. This bit V1 starts the no-voice compensation noise generator 222. Labeled "UV Data" is 319-bit data other than the bit V1. This data is ineffective data, so that all the bits other than the bit V1 may be "0", for instance.

Figure 8:
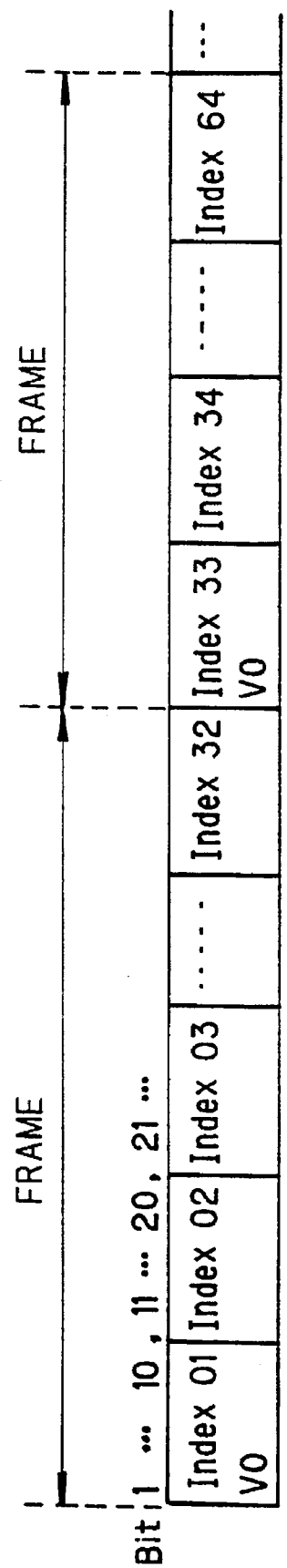

Shown in FIG. 8 is the format of the signal S7 when the index cell data from the LD-CELP speech coder 211 is received. Labeled V0 is the forefront bit of the frame (i.e., MSB of index). This bit indicates that the prevailing frame is of voice data, and it starts the LD-CELP speech decoder 221.

As has been described in the foregoing, according to the present invention input/output coded data of a high efficient speech codec unit and voice/no-voice data can be multiplexed together by an ATM speech Coding system. It is also possible to separate the high efficient speech codec unit and CLAD unit from each other by the provision on the CLAD unit side of voice/no-voice bit extraction means and FAX start data detection means. With this structure, it is possible in a network, which is provided by inter-connecting an existing CBR network and an ATM network, to introduce CLAD as a constituent element of the present invention to a point of connection to the ATM network without changing the transmission rate of the existing CBR network by replacing a high efficient speech codec in the CBR network with the high efficient speech codec as a constituent element of the ATM speech coding system according to the present invention. This eliminates the need for repeated decoding and coding of data in the prior art inter-connection system and permits minimizing the speech quality deterioration.

A further advantage of the present invention is that the signal propagation delay that is Generated due to data storage for cell assembling and disassembling in the CLAD and also to high efficient speech codec and decoding, can be minimized with an arrangement that the output of the high efficient speech codec to the CLAD is multiplexed on the last of cell data and conversely the output of the CLAD to the high efficient speech codec is multiplexed on the forefront of cell data.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An asynchronous transmission mode speech coding system comprising:

a high efficient speech codec unit provided between an asynchronous transmission mode transmission line along which digital data is transmitted and received in an asynchronous transmission mode, and a switchboard for switching telephone frequency band speech signals and for high efficient coding and decoding of the telephone frequency band speech signals and FAX signals; and a cell assembling and disassembling unit including means for dividing coded data from the high efficient speech codec unit into frames of a first fixed bit number, adding a header of a second fixed bit number to each of the frames, producing a cell having a third fixed number and sending out the cell thus produced to the asynchronous transmission mode transmission line, and means for separating data having been coded in the high efficient speech codec unit from cells transmitted from the asynchronous transmission mode transmission line and transmitting the separated data to the high efficient speech codec unit;

the high efficient speech codec unit including:
speech coding means for coding a telephone frequency band speech signal received from the switchboard into digital data of a low bit rate and outputting the coded data as a digital speech signal of a first format;

speech detecting means for outputting voice/no-voice information of input speech by checking input signal power from the telephone frequency band speech signal received from the switchboard; and a facsimile signal coding means for checking, from the telephone frequency band speech signal received from the switchboard, whether an input terminal is a modulated signal from a facsimile input terminal and, if the input signal is a modulated signal from the facsimile input terminal, sending out a facsimile signal detection signal indicative of the reception of the modulated signal while sending out a digital speech signal of a second format for a predetermined period of time and then sending out a digital signal of a third format obtained through demodulation of the modulated signal;

the cell assembling and disassembling unit further including:

facsimile transmission start data detecting means for detecting the second format digital speech signal for a predetermined period of time; and cell producing means for producing cells of the third fixed bit number by adding a header of the second fixed bit number to each frame of a digital speech signal of a fourth format or of the digital speech signals of the second and third formats and sending out the cell thus produced to the asynchronous transmission mode transmission line;

the cell assembling and disassembling unit still further including:

means for deleting the header of the second fixed bit number from each cell received from the asynchronous transmission mode transmission line and transmitting the resultant data as a digital signal of a seventh format to the high efficient speech codec unit; and means for transmitting a digital signal of a sixth format to the high efficient speech codec unit in the absence of cell received from the asynchronous transmission mode transmission line;

the high efficient speech codec unit further including:

means for checking whether digital signal of the sixth format is received from the cell assembling and disassembling unit and, if the signal is received, outputting noise to the switchboard; and facsimile signal decoding means for detecting, when no digital signal of the sixth format is received from the cell assembling and disassembling unit, the digital voice signal of the second format from the digital signal of the seventh format for a predetermined period of time and when it is detected modulating the subsequent digital signal of the third format and transmitting the modulated signal to the switchboard;

the high efficient speech codec unit still further including:

means for receiving the digital speech signal of the first format and result data of the check in a voice detecting means and producing the digital speech signal of the fourth format by multiplexing the two received signals through bit steal of one bit for each frame; and means for receiving the digital speech signal of the fourth format and the facsimile signal detection signal as well as the second format digital speech signal and third format digital signal from the facsimile signal coding means, selecting the fourth format digital speech signal if the facsimile signal detection signal indicates detection of no facsimile signal while selecting the second format digital speech signal and the third format digital signal from the facsimile signal coding means if the facsimile signal detection signal indicates detection of a facsimile signal, and transmitting the selected signal as a digital signal of a fifth format to the cell assembling and disassembling unit;

the cell assembling and disassembling unit yet further including:

voice/no-voice bit detecting means for extracting the result data, having been bit steal multiplexed, of the voice detecting means from the digital signal of the fifth format; and cell producing means controlled according to the voice/no-voice bit so as to assemble cell data of a frame configuration of the cells of the cell producing means from the second and fourth format digital speech signals if the bit indicates voice and assembling no cell data if the bit indicates un-voice, and also controlled according to the result of detection of the facsimile transmission start data such that if the digital speech signal of the second format has been detected for a predetermined period of time, subsequently received data is not subjected to the cell production control according to the voice/no-voice bit but is all converted to cell data to be sent out to the asynchronous transmission mode transmission line;

the high efficient speech codec unit yet further including:

speech decoding means for decoding the digital speech signal of the seventh format and transmitting the decoded signal to the switchboard if no digital signal of the sixth formats is detected as digital signal received from the cell assembling and disassembling unit or if not digital speech signal of the seventh format is detected from the digital signal of the seventh format.

2. The asynchronous transmission mode speech coding system according to claim 1, wherein:

the digital speech signal of the fourth format is serial data in which the voice/no-voice bit as the output of the voice detecting means is multiplexed in the forefront of each frame of the output of the speech coding means;

the signal that is power checked by the speech detecting means corresponds to input speech for a predetermined period of time for coding into digital speech signal of a frame configuration by the speech coding means; and the voice/no-voice bit is multiplexed in the forefront of next frame to the frame as the subject of coding.

3. The asynchronous transmission mode speech coding system according to claim 1, wherein:

the cell producing means including:

a memory buffer capable of storing data for one frame; and cell production control means for causing the digital data of the fifth format received from the high efficient speech codec unit to be stored progressively in the memory buffer and causing cell production to be executed upon reception of the voice/no-voice bit as the forefront bit of the next frame;

the cell production control means of the memory buffer being cell assembling means having control means for causing present frame data stored in the memory buffer to be discarded and causing no cell production if the digital signal of the fifth format is the digital speech signal of the second or fourth format and also if the forefront bit of the next frame indicates no-voice and, if the next frame forefront bit indicates voice, causing cell production after providing a bit indicative of voice as the forefront bit of the present frame stored in the memory buffer.

4. The asynchronous transmission mode speech coding system according to claim 2, wherein:

the cell producing means including:

a memory buffer capable of storing data for one frame; and cell production control means for causing the digital data of the fifth format received from the high efficient speech codec unit to be stored progressively in the memory buffer and causing cell production to be executed upon reception of the voice/no-voice bit as the forefront bit of the next frame;

the cell production control means of the memory buffer being cell assembling means having control means for causing present frame data stored in the memory buffer to be discarded and causing no cell production if the digital signal of the fifth format is the digital speech signal of the second or fourth format and also if the forefront bit of the next frame indicates no-voice and, if the next frame forefront bit indicates voice, causing cell production after providing a bit indicative of voice as the forefront bit of the present frame stored in the memory buffer.

5. The asynchronous speech coding system according to claim 1, wherein:

the means for coding the telephone frequency band speech signal into the low bit rate digital data and for decoding the low bit rate digital data into the telephone frequency band speech signal is a low-delay code exciting linear prediction system also called a low-delay code-excited linear prediction system for decoding a synthesized speech from a speech codebook constituted by a plurality of exciting source vectors by using a linear prediction coefficient, retrieving an exciting source victor giving synthesized speech closest to input speech, and selecting and outputting an index number of an optimum index;

the multiplexing of the voice/no-voice bit is executed through bit steal of a most significant bit of the index periodically and also for each frame; and index retrieval in a bit steal cycle is made by using only one half of the exciting source vectors in the speech codebook.

6. The asynchronous speech coding system according to claim 2, wherein:

the means for coding the telephone frequency band speech signal into the low bit rate digital data and for decoding the low bit rate digital data into the telephone frequency band speech signal is a low-delay code-excited linear prediction system for decoding a synthesized speech from a speech codebook constituted by a plurality of exciting source vectors by using a linear prediction coefficient, retrieving an excited source vector giving synthesized speech closest to input speech, and selecting and outputting an index number of an optimum index;

the multiplexing of the voice/no-voice bit is executed through bit steal of a most significant bit of the index periodically and also for each frame; and index retrieval in a bit steal cycle is made by using only one half of the exciting source vectors in the speech codebook.

7. The asynchronous speech coding system according to claim 3, wherein:

the means for coding the telephone frequency band speech signal into the low bit rate digital data and for decoding the low bit rate digital data in the telephone frequency band speech signal is a low-delay code exciting linear prediction systems also called a low-delay code-excited linear prediction system for decoding a synthesized speech from speech codebook constituted by a plurality of exciting source vectors by using a linear prediction coefficient, retrieving an exciting source vector giving synthezized speech closet to input speech, and selecting and outputting an index number of an optimum index;

the multiplexing of the voice/no-voice bit is executed through bit steal of a most significant bit of the index periodically and also for each frame; and index retrieval in a bit steal cycle is made by using only one half of the exciting source vectors in the speech codebook.

8. An asynchronous speech coding system for inputting and outputting a telephone frequency band signal with respect to a switchboard through a high efficient speech codec unit and for inputting and outputting cells with respect to an ATM transmission line through a cell assembly and disassembly ("CLAD") unit, said high efficient speech codec unit comprising on a transmission side, a low-delay code-exited linear prediction ("LD-CELP") speech coder for coding a speech signal, a speech detector for detecting voice and no-voice by monitoring an input speech power, a FAX signal coder for detecting a modulation signal inputted from a FAX terminal, a multiplexer for receiving a first signal from the speech detector and a second signal from the LC-CELP speech coder, and a selector for receiving a third signal of the multiplexer, a fourth signal indicative of FAX start data which is transmitted for a predetermined period of time upon detection of the FAX signal, and a fifth signal which is demodulated data of a modulated signal from actual FAX terminal of the FAX signal coder and output a sixth signal indicative of whether the FAX signal has been detected and selecting, based on the sixth signal, one of the fourth, sixth signals, and the third signal of the multiplexer as a seventh signal of the transmitting side of the high efficient speech codec unit, said CLAD unit comprising, on the transmission side a voice/no-voice bit detector for receiving the seventh signal from the transmitting side of the high efficient speech codec unit and extracting the voice/no-voice bit from the seventh signal, a FAX start data detector for detecting the fourth signal from the seventh signal, and a cell assembler which, in case of failure of detection of the fourth signal from the seventh signal, assembles cells and sends out the assembled with a header data to the ATM transmission line according to the result of detection in the voice/no-voice bit detector, and on a receiving side a voice cell data receiver which, when receiving the cell data from the ATM transmission line, deletes the header data that has been added on the transmitting side and outputs the resultant data in the frame format of an eighth signal, and a no-voice cell data receiver which, in the absence of cell received, outputs a ninth signal having a frame configuration, the high efficient speech codec unit further including on the receiving side, an LD-CELP speech decoder for decoding the eighth signal received from the CLAD unit to reproduce a speech signal, a no-voice compensation noise generator for outputting a first control signal for controlling the switching of the output signal to the switchboard and, no-voice compensation white noise at a level close to the environmental noise of the speech, the input signal from the CLAD unit is of the ninth signal format and, a FAX signal decoder for outputting a second control signal for controlling the switching of the output signal to the switchboard and modulating the subsequent fifth signal to output the modulated signal as the FAX signal if the fourth signal is received, and a selector for selectively outputting, according to the first and second control signals, either one of the outputs of the LD-CELP speech decoder, no-voice compensation noise generator and FAX signal signal decoder to the switchboard.

9. The asynchronous speech coding system according to claims 8, wherein said LD-CELP speech coder comprises:

a codebook having a plurality of exciting source vector candidates;

a synthesis filter for successively receiving the exciting source vector candidates having coefficients for synthesized signal calculation obtained by a linear prediction analysis result;

a comparator for comparing successive the input speech vectors with the synthesis filter output and outputting an index of the exciting vector which permits obtaining reproduced speech closest to the input; and a codebook address controller for reducing the number of exciting source vector candidates with the timing of the bit steal according to the fist signal from the voice detector.

10. An asynchronous transmission mode speech coding system comprising:

a high efficient speech codec unit provided between an asynchronous transmission mode transmission line along which digital data is transmitted and received in an asynchronous transmission mode, and a switchboard for switchboard for switching telephone frequency band speech signals and for high efficient coding and decoding of the telephone frequency band speech signals and FAX signals; and a cell assembling and disassembling unit including a device to divide coded data from the high efficient speech codec unit into frames of a first fixed bit number, to add a header of a second fixed bit number to each of the frames, to produce a cell having a third fixed number and to send out the cell thus produced to the asynchronous transmission mode transmission line, and device to separate data having been coded in the high efficient speech codec unit from cell transmitted from the asynchronous transmission mode transmission line and and transmit the separated data to the high efficient speech codec unit;

the high efficient speech codec unit including:

a speech coding device for coding a telephone frequency band speech signal received from the switchboard into digital data of a low bit rate and outputting the coded data as a digital speech signal of a first format;

a speech detector to output voice/no-voice information of input of input speech by checking input signal power from the telephone frequency band speech signal received from the switchboard; and a facsimile signal coding device to check, from the telephone frequency band speech signal received from the switchboard, whether an input terminal is a modulated signal from a facsimile input terminal and, if the input signal is a modulated signal from the facsimile input terminal, to send out a facsimile signal detection signal indicative of the reception of the modulated signal while sending out a digital speech signal of a second format for a predetermined period of time and then to send out a digital signal of a third format obtained through demodulation of the modulated signal;

the cell assembling and disassembling units further including:
a facsimile transmission start data detector to detect the second format digital speech signal for a predetermined period of time; and a cell producing device to produce cells of the third fixed bit number by adding a header of the second fixed bit number to each frame of a digital speech signal of a fourth format or of the digital speech signals of the second and third formats and to send out the cell thus produced to the asynchronous transmission mode transmission line;

the cell assembling and disassembling unit still further including:
a device to delete the header of the second fixed bit number from each cell received from the asynchronous transmission mode transmission line and to transmit the resultant data as a digital signal of a seventh format to the high efficient speech codec unit; and a transmitting device to transmit a digital signal of a sixth format to the high efficient speech codec unit in the absence of cell received from the asynchronous transmission mode transmission line;

the high efficient speech codec unit further including:
a checking device to check whether digital signal of the sixth format is received from the cell assembling and noise to the switchboard; and a facsimile signal decoding device to detect, when no digital signal of the sixth format is received from the cell assembling and disassembling unit, the digital voice signal of the second format from the digital signal of the seventh format for a predetermined period of time and when it is detected to modulate the subsequent digital signal of the third format and to transmit the modulated signal to the switchboard;

the high deficient speech codec unit still further including:

a device to receive the digital speech signal of the first format and result data of the check in a voice detecting device and to produce the digital speech signal of the forth format by multiplexing the two received signals through bit steal of one bit for each frame; and a device to receive the digital speech signal of the fourth format and the facsimile signal detection signal as well as the second format digital speech signal and third format digital signal from the facsimile signal coding device, to select the fourth format digital speech signal if the facsimile signal detection signal indicates detection of no facsimile signal while selecting the second format digital speech signal and the third format digital signal from the facsimile signal coding device if the facsimile signal detection signal indicates section of a facsimile signal, and transmitting the selected signal as a digital signal of a fifth format to the cell assembling and disassembling unit;

the cell assembling and disassembling unit yet further including:
a voice/no-voice bit detector for extracting the result data, having been bit steal multiplexed, of the voice detecting device form the digital signal of the fifth format; and a cell producing device controlled according to the voice/no-voice bit so as to assemble cell data of a frame configuration of the cells of the cell producing device from the second and fourth format digital speech signals if the bit indicates voice while assembling no cell data it the bit indicates un-voice, and also controlled according to the result of detection of the facsimile transmission start data such that if the digital speech signal of the second format has been detected for a predetermined period of time, subsequently received data is not subjected to the cell production control according to the voice/no-voice bit but is all converted to cell data to be sent out to the asynchronous transmission mode transmission line;

the high efficient speech codec unit yet further including:
speech decoding device to decode the digital speech signal of the seventh format and transmitting the decoded signal to the switchboard if no digital signal of the sixth formats is detected as digital signal received from the cell assembling and disassembling unit or if not digital speech signal of the seventh format is detected from the digital signal of the seventh format.

\* \* \* \* \*